United States Patent [19]

Oyama et al.

[11] Patent Number: 5,458,455
[45] Date of Patent: Oct. 17, 1995

[54] APPARATUS FOR STACKING CARTRIDGE SHELL PLATES OF A PHOTOGRAPHIC FILM CARTRIDGE

[75] Inventors: Shoji Oyama; Koichi Takahashi, both of Kanagawa, Japan

[73] Assignee: Fuji Photo Film Co., Ltd., Kanagawa, Japan

[21] Appl. No.: 208,679

[22] Filed: Mar. 11, 1994

[30] Foreign Application Priority Data

Mar. 11, 1993 [JP] Japan .................... 5-051097

[51] Int. Cl.$^6$ .................... B65G 57/04; B65G 57/10
[52] U.S. Cl. .................... 414/791.1; 414/788.9; 414/793.2; 209/577; 209/939; 198/439
[58] Field of Search ............ 414/788.9, 791.1, 414/793.2, 793.3, 794.5; 198/365, 370, 439, 803.6; 209/576, 577, 904, 939

[56] References Cited

U.S. PATENT DOCUMENTS

| | | | |
|---|---|---|---|
| 2,940,581 | 6/1960 | Chebuhar | 198/803.6 |
| 2,940,584 | 6/1960 | Kunz | 198/803.6 |
| 3,167,192 | 1/1965 | Harrison et al. | 198/365 |
| 3,528,539 | 9/1970 | Speaker et al. | 198/365 |
| 3,616,895 | 11/1971 | Lopresti et al. | 198/365 |
| 4,727,991 | 3/1988 | Mosden et al. | 414/793.3 |
| 4,820,102 | 4/1989 | Messerly et al. | 414/788.9 |
| 4,862,579 | 9/1989 | Takahashi et al. | 156/552 |
| 5,388,706 | 2/1995 | Baldur | 209/939 |

FOREIGN PATENT DOCUMENTS

| | | | |
|---|---|---|---|
| 3290654 | 12/1991 | Japan | G03C 3/00 |
| 3290657 | 12/1991 | Japan | G03C 3/00 |
| 3-290657 | 12/1991 | Japan | |

*Primary Examiner*—Michael S. Huppert
*Assistant Examiner*—Douglas A. Hess
*Attorney, Agent, or Firm*—Sughrue, Mion, Zinn, Macpeak & Seas

[57] ABSTRACT

A cartridge shell plate stacking apparatus has a plurality of arms circulating along an annular cam rail. Each arm has a magnet in its distal end. The cam rail lowers the distal end of the arm in a pick-up station to cause the magnet to attract one of the cartridge shell plates successively conveyed on a bucket conveyer and hold the shell plate in the horizontal state with plush ribbons stuck on the upside surfaces. The cam rail also lowers the distal end of the arm in a piling station wherein a piling box having a cut-out formed in the top edge of a side wall is disposed. Although the distal end passes through the cut-out, the cartridge shell plate cannot pass and strikes against the side wall, thereby to drop into the piling box.

16 Claims, 7 Drawing Sheets

APPARATUS FOR STACKING CARTRIDGE SHELL PLATES OF A PHOTOGRAPHIC FILM CARTRIDGE

BACKGROUND OF THE INVENTION

1. Field of the Invention

The present invention relates to an apparatus for stacking cartridge shell plates of photographic film cartridges before assembling the photographic film cartridges.

2. Description of the Related Art

ISO 135-type photographic film cartridges are one of the most popular types of photographic film cartridges in use today. The 135-type film cartridge is constituted of a resin spool, a 35 mm filmstrip coiled around the spool, and a metal housing in which the spool and the filmstrip are contained. The housing is constituted of a cartridge shell plate bent into a cylindrical tube and a pair of caps fitted on the ends of the tube. Also a pair of light-trapping pieces or plush ribbons are stuck on the shell plate to prevent entrance of light through a film passage mouth of the housing which is formed by the ends of the shell plate that extend in the axial direction of the tube.

To produce such a film cartridge, the shell plates of the housing are blanked out of a metal plate and are bent into a U-shape. The plush ribbons are stuck onto the inside surface of the U-shaped blank or shell plate. Then, the shell plate is rounded into the cylindrical tube, into which the film roll wounded on the spool is inserted. Thereafter, the caps are attached to the tube to complete the assembly of the film cartridge.

Because there is a difference in speed between the plush sticking process and the cartridge assembly process, the shell plates to which the plush ribbons are stuck are temporarily stacked on a tray or the like. An automatic photographic film cartridge assembling apparatus having an automatic stacking system for the U-shaped shell plates is disclosed in Japanese Laid-open Patent Applications Nos. 3-290654 and 3-290657.

In the known shell plate stacking system, the cartridge shell plate is carried in the horizontal state with the plush ribbons stuck on the upside surface thereof, and is picked up by a magnet pulley. Then the cartridge shell plate is carried in the standing attitude on a belt conveyer having magnets disposed in the lower portion thereof. A stopper is disposed along the belt conveyer to dam up the cartridge shell plates and gather the same into a pile. When a predetermined amount of cartridge shell plates are thus accumulated, a robot hand removes the pile of the cartridge shell plates from the belt conveyer.

However, because the above-described known apparatus carries the cartridge shell plates in the standing attitude, the cartridge shell plates are unstable and may often fall over on the belt conveyer. If a cartridge shell plate falls over, it is necessary to stop the belt conveyer and put the cartridge shell plate in order. Also, because the robot hand does not pick up the cartridge shell plates from the belt conveyer until the pile of the cartridge shell plates reaches the predetermined amount, if no further cartridge shell plate is fed to the belt conveyer for, for example, during changing the type or design of film cartridge, the cartridge shell plates remaining on the belt conveyer must be manually transferred to the tray. Therefore, the efficiency of operation is unsatisfactory.

Moreover, because successive transportation of the cartridge shell plates in the standing attitude does not permit inspection of the outer surfaces of the cartridge shell plates, it is impossible to prevent the piling of a cartridge shell plate having a defective outer surface together with non-defective cartridge shell plates.

SUMMARY OF THE INVENTION

In view of the foregoing, an object of the present invention is to provide a cartridge shell plate stacking apparatus which can reliably and efficiently convey the cartridge shell plates to store the same in a pile before they are assembled into photographic film cartridges.

To achieve the above and other objects, the present invention provides a plurality of arms each having an attraction member for holding a cartridge shell plate thereon in a horizontal state with plush ribbons stuck on the upside surface of the cartridge shell plate. The arms are driven by an arm drive device to circulate through first and second sections. The arm device runs the arms at the same speed in the first section as the conveying speed of the cartridge shell plate on a conveyer. A cam member is provided for transiently lowering the arms in the first and second sections. The cartridge shell plate conveyed on the conveyer is picked up by the attraction member of the arm in the first section. A separation member is disposed in association with the second section, for detaching the cartridge shell plate from the attraction member. According to this construction, the shell plates are stably conveyed and piled.

According to a preferred embodiment, the attraction member is a magnet mounted in a distal end of the arm such that the magnet does not contact the cartridge shell plate, and the cam is a cam rail. A pulley coupled to the arm rolls along the cam rail when the arm is moved by the arm drive device. The cam rail includes a bypass rail section for bypassing the second section and a change-over rail section movable to connect either to the second section or to the bypass rail section. Detachment of the cartridge shell plate from the magnet is avoided when the pulley rolls along the bypass rail section. This construction makes it easy to sort and pile the cartridge shell plates according to the type of the photographic film cartridge or depending on whether the cartridge shell plate is defective or not.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENT

Figure 1:
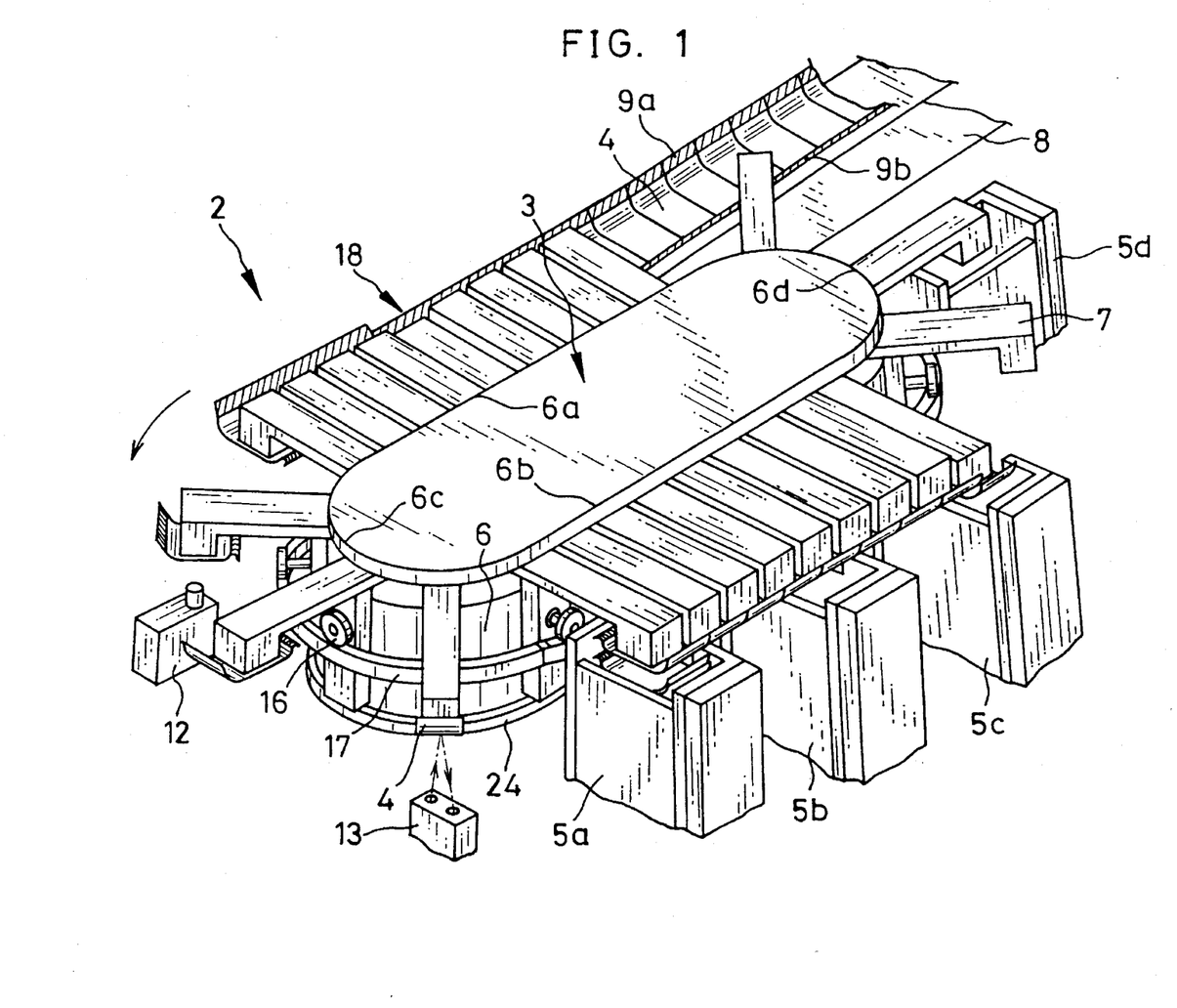
FIG. 1 is a perspective view of a cartridge shell plate stacking apparatus according to a preferred embodiment of the present invention.

Referring to FIG. 1, a cartridge shell plate stacking apparatus 2 is constituted of a spider arm conveyer 3 and first to fourth piling boxes 5a, 5b, 5c and 5d for piling cartridge shell plates 4 therein. The conveyer 3 is constituted of a conveyer body 6 having an oval periphery and a plurality of L-shaped arms 7 moving around the periphery of the conveyer body 6. A drive mechanism for rotating the arms 7 is mounted in the conveyer body 6, although the arm drive mechanism is not shown in FIG. 1 for clarity. The periphery of the conveyer body 6 provides first and second straight track sections 6a and 6b and first and second curves 6c and 6d connecting the straight track sections 6a and 6b to each other. The first to third piling boxes 5a to 5c are for collecting non-defective cartridge shell plates 4 of photographic film cartridges, and the fourth piling box 5d is for collecting defective cartridge shell plates 4.

A bucket conveyer 8 is disposed beside the first straight track section 6a in parallel therewith. The bucket conveyer 8 carries the cartridge shell plates 4 in the horizontal state with light-trapping plush ribbons 9a and 9b stuck on the upside surface of the shell plates 4 so that the plush ribbons 9a and 9b will not be removed or damaged by the bucket conveyer 8. The first to third piling boxes 5a to 5c are disposed beside the second straight track section 6b at regular intervals along section 6b. The fourth piling box 5d is disposed beside the second curve 6d.

Figure 6:
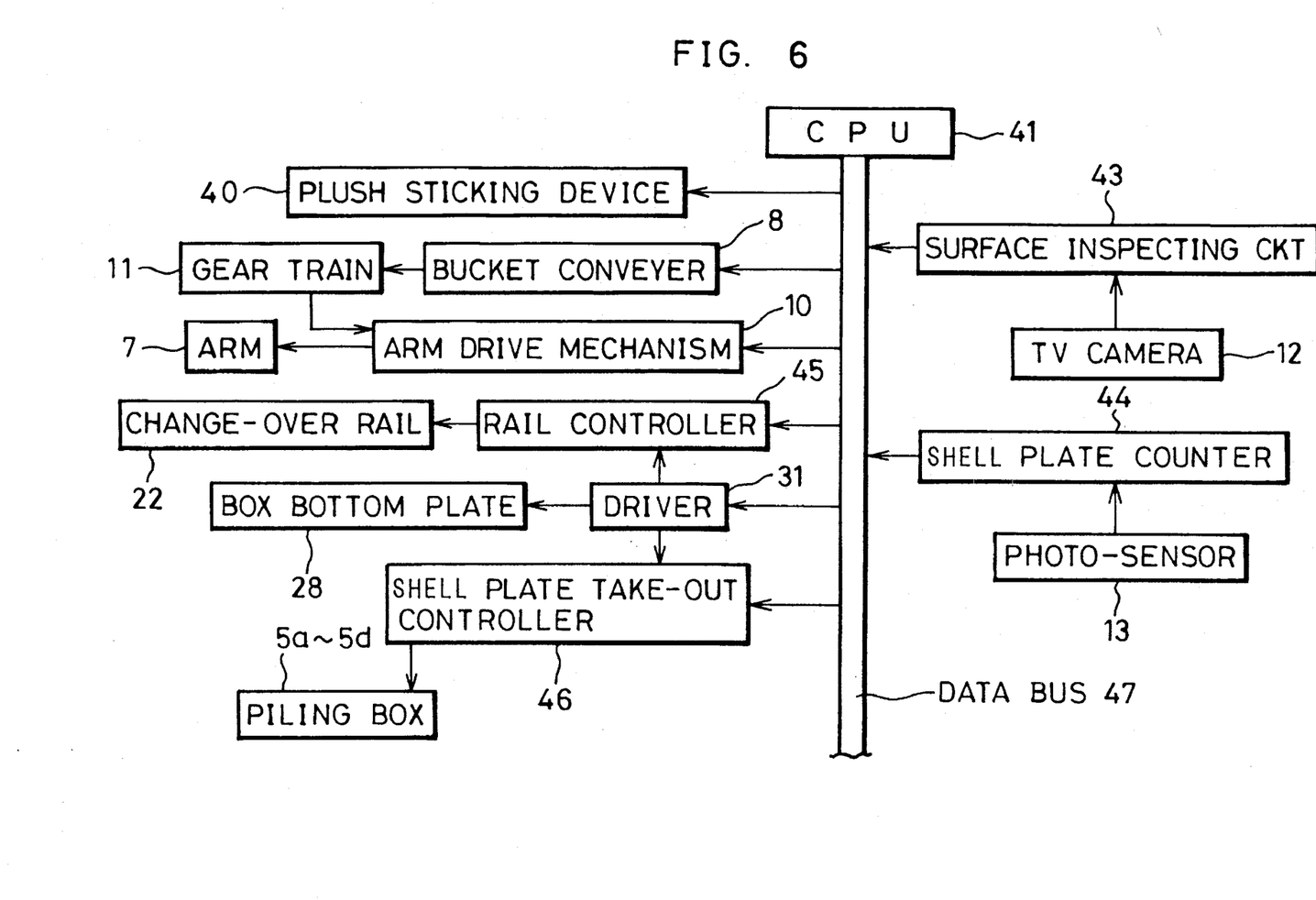
FIG. 6 is a block diagram illustrating the operation of the cartridge shell plate stacking apparatus shown in FIG. 1.

The bucket conveyer 8 is coupled to the arm drive mechanism 10 of the spider arm conveyer 3 through a gear train 11, as is functionally illustrated in FIG. 6, to drive the arms 7 synchronously with the bucket conveyer 8. The arm drive mechanism 10 rotates a chain to which the base portions of the arms 7 are linked at constant intervals. Thereby, the arms 7 move at the same speed as the bucket conveyer 8 around the periphery of the conveyer body 6 in the counterclockwise direction in FIG. 1. Accordingly, the spacing between the distal ends 7a of the adjacent arms 7 is small in the straight track sections 6a and 6b, whereas the spacing is increased when the arms 7 pass around the curves 6c and 6d. One of the cartridge shell plates 4 successively fed by the bucket conveyer 8 is picked up by one of the arms 7 in the first straight track section 6a. Along the first curve 6c, monitoring and controlling processes are provided. For example, it is determined through a TV camera 12 if the cartridge shell plate 4 has any defect such as scratches or stains on the outer surface, and the number of the cartridge shell plates 4 is counted based on a detection signal from a reflective photosensor 13.

Figure 2:
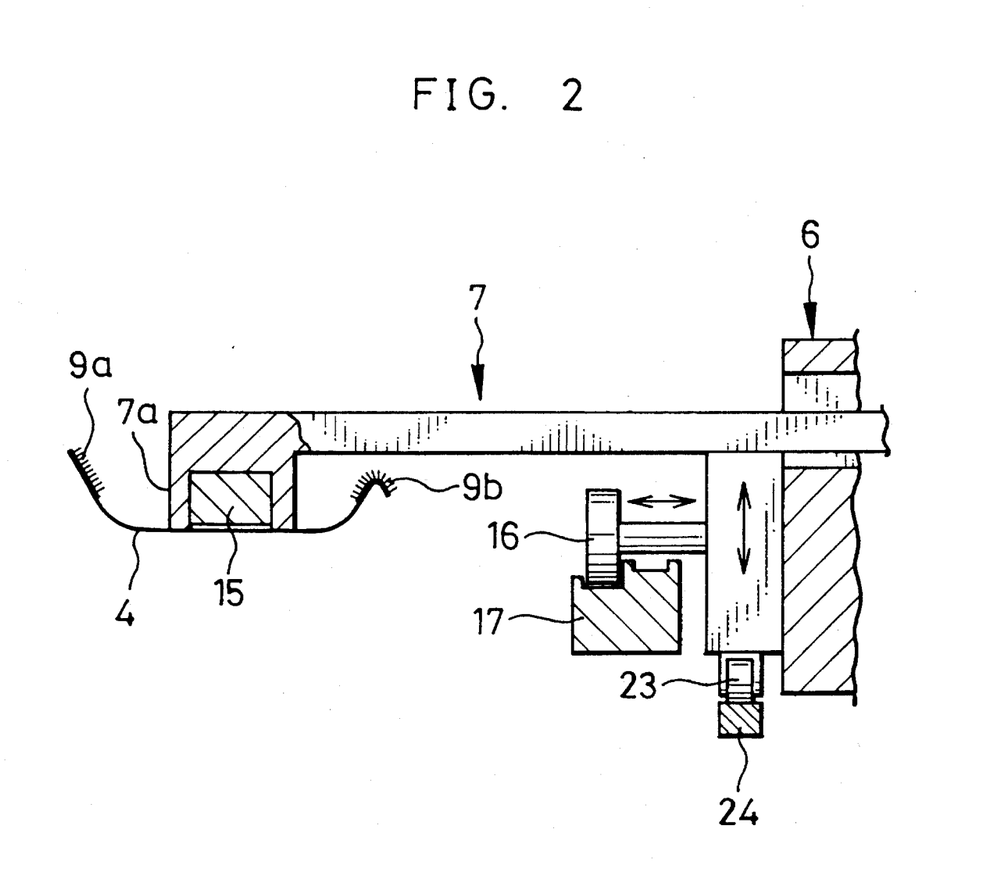
FIG. 2 is a vertical sectional view of essential parts of the cartridge shell plate stacking apparatus shown in FIG. 1.

As shown in FIG. 2, a magnet 15 is provided on the distal end 7a of the arm 7 for picking up the cartridge shell plate 4 which is made of iron. The magnet 15 is recessed by a distance, e.g., about 0.05 mm to 1 mm, from the bottom surface of the distal end so as not to directly contact the cartridge shell plate 4. A main pulley 16 is rotatably mounted to the arm 7, and is also movable in the axial direction of the main pulley 16. The main pulley 16 rolls along a rail 17 having cam grooves and extending around the periphery of the conveyer body 6. The cam groove of the rail 17 is made deeper at a pick-up station 18 disposed in the middle of the first straight track section 6a, so that the arm 7 is transiently lowered while passing the pick-up station 18.

Figure 3:
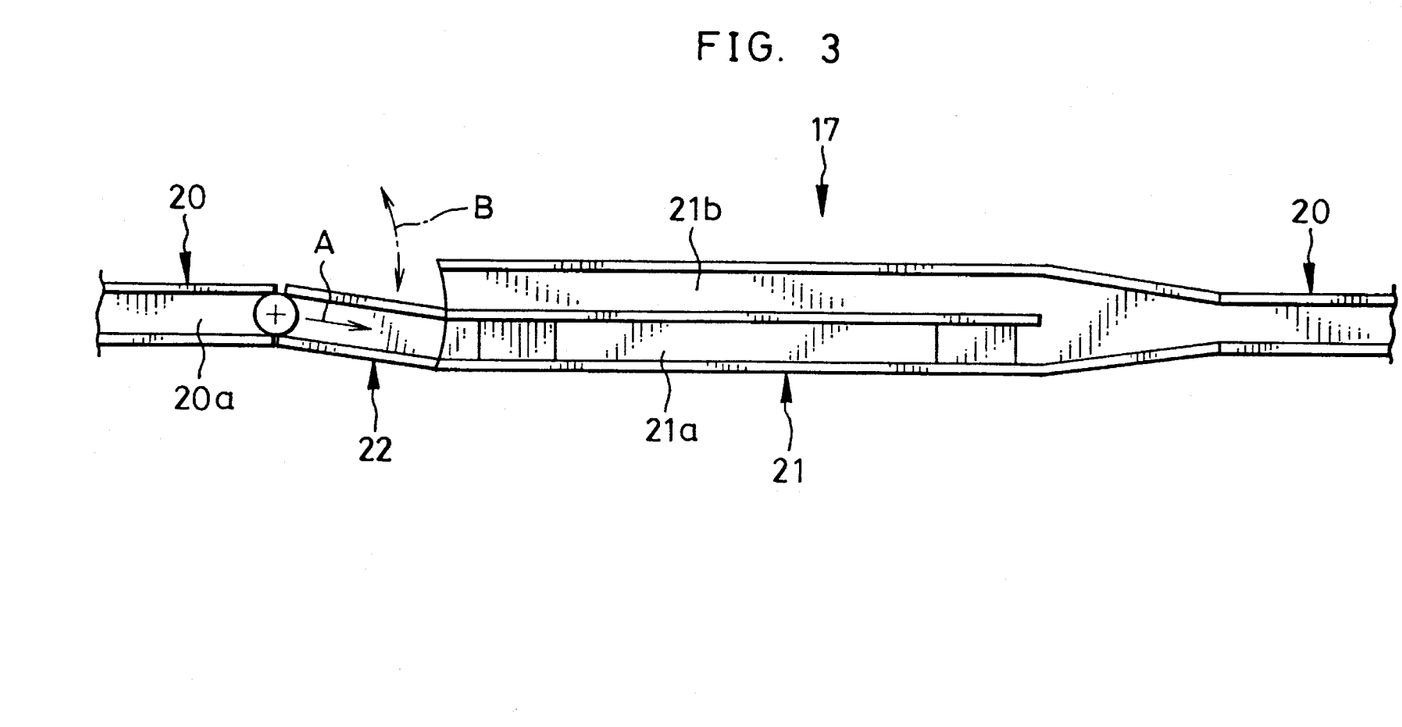
FIG. 3 is a fragmentary top plane view of the cam rail of the spider arm conveyer of the cartridge shell plate stacking apparatus shown in FIG. 1.

Also at each of piling stations which are disposed in association with the respective piling boxes 5a to 5d, the rail 17 is constructed as is shown in FIG. 3, wherein a double-track portion 21 having a pair of cam grooves 21a and 21b is interposed between single-track portions 20 having a single cam groove 20a each. A change-over rail portion 22 having a single groove 22a is provided between the trailing end of the single-track portion 20 and the leading end of the double-track portion 21 with respect to the moving direction indicated by an arrow A in FIG. 3. As indicated by an arrow B, the change-over rail portion 22 may swing to connect the single cam groove 20a to either one of the cam grooves 21a and 21b of the double-track portion 21.

Figure 4:
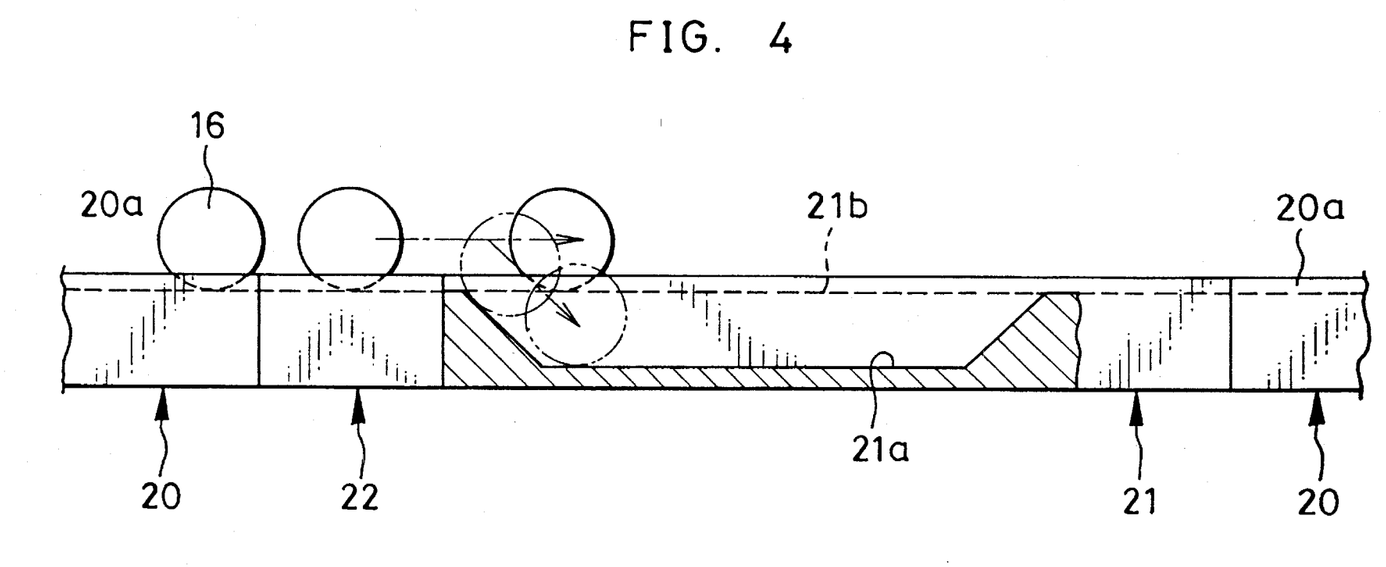
FIG. 4 is a side view of the cam rail of FIG. 3, partly in section.

The cam grooves 21a and 21b have different depths as is shown in FIGS. 2 and 4. Therefore, when the pulley 16 rolls along the cam groove 21a, as is shown by phantom lines in FIG. 4, the arm 7 moves on a lower course compared with the case where the pulley 16 rolls along the cam groove 21b, as is shown by solid lines. Because the main pulley 16 is axially movable, the main pulley 16 may go through either of the grooves 21a and 21b while maintaining the arm 7 immovable in the direction transverse to the moving direction.

In order to reduce the load on the change-over rail portion 22, that is, the weight of the arm 7 applied on the change-over rail portion 22 when the main pulley 16 passes through it, a subsidiary pulley 23 rolling on a cam follower rail 24 is mounted in a portion of the arm 7 which is below the main pulley 16, as is shown in FIG. 2. Otherwise, the load on the change-over rail portion 22 may decrease the change-over speed and cause poor operation.

Figure 5:
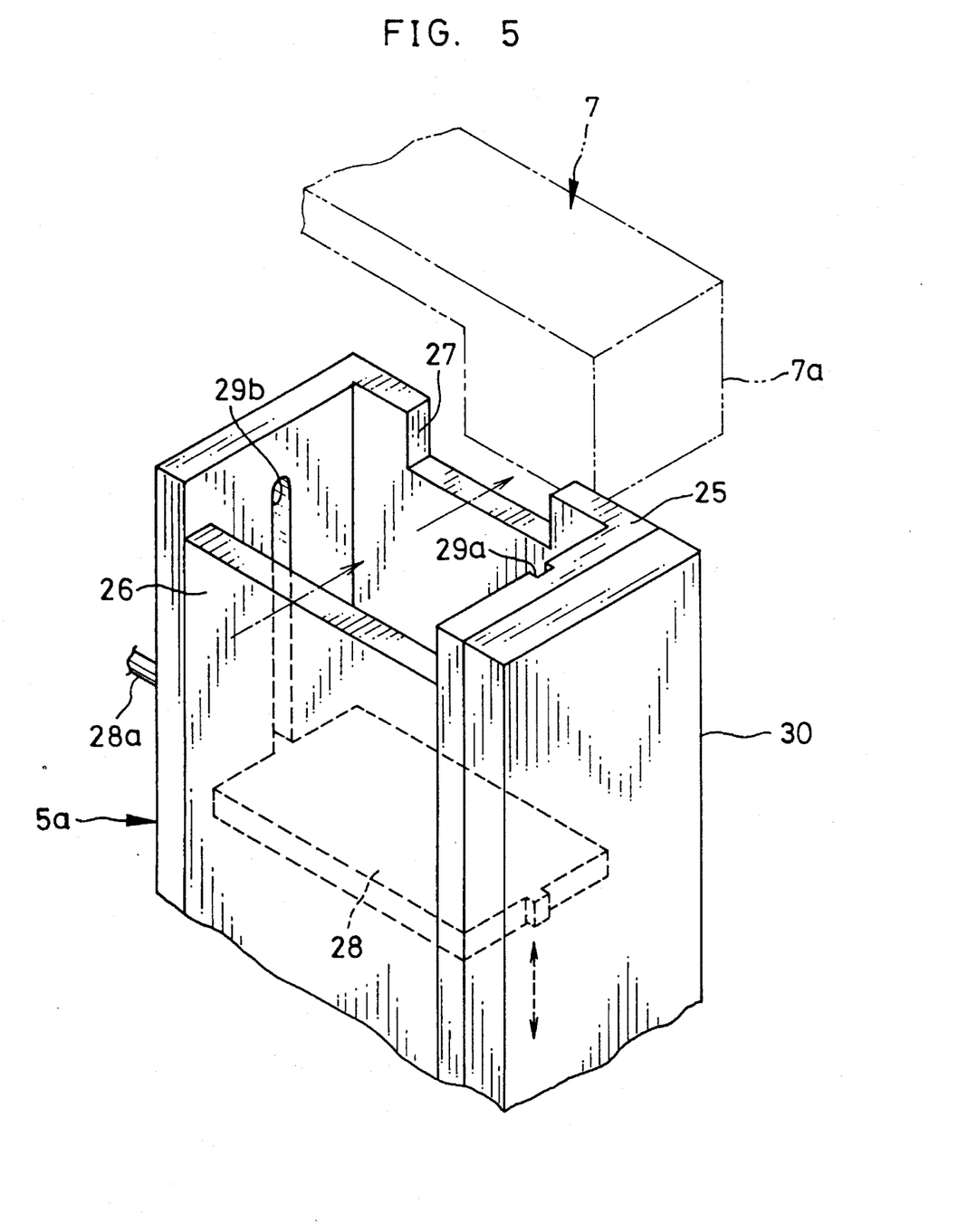
FIG. 5 is a perspective view of the piling box of the cartridge shell plate stacking apparatus shown in FIG. 1.

The piling boxes 5a to 5d are deep or vertically long rectangular boxes having the same construction, as shown in FIG. 5, with respect to the first piling box 5a. Three sides of the piling box 5a are formed by a channel-shaped wall portion 25, and another side is formed by a flat wall portion 26. The top edge of the flat wall portion 26 is lower than that of the channel-shaped wall portion 25, to permit entrance of the distal end 7a of the arm 7 accompanied with the cartridge shell plate 4 into the piling box 5a when the arm 7 moves on the lower course, as shown by phantom lines in FIG. 5. A cut-out 27 is formed in the top edge of the channel-shaped wall portion 25 in the path of the distal end 7a of the arm 7. The cut-out 27 is sized to permit passage of only the distal end 7a when the arm 7 moves on the lower course. At that time, the cartridge shell plate 4 having been attached to the distal end 7a of the arm 7 strikes against the wall portion 25 is separated from the magnet 15 and drops into the piling box 5a.

On the other hand, when the arm 7 moves on the higher course, that is when, the pulley 16 rolls along the cam groove 21b, the cartridge shell plate 4 held on the arm 7 will not contact the wall portions 25 and 26. It is to be noted that the cartridge shell plate 4 is omitted from FIG. 5 for clarity.

As shown by dashed lines in FIG. 5, a bottom plate 28 of the piling box 5a is mounted to be vertically movable along a groove 29a and a slot 29b formed in opposite side walls of the channel-shaped wall portion 25. Each time the cartridge shell plate 4 is put into the piling box 5a, the bottom plate 28 is lowered a predetermined amount by a driver 31 through a shaft 28a. A magnet plate 30 is cemented to the outside of the side wall of the wall portion 25 that is disposed farther from the conveyer body 6. The magnet plate 30 attracts the piled cartridge shell plates 4 through the wall portion 25, thereby maintaining the cartridge shell plates 4 piled in the horizontal state at uniform spacings inside the piling box 5a.

According to a preferred embodiment, the wall portions 25 and 26 are made of aluminum and processed with a tufram treatment. However, the wall portions 25 and 26 may be made of plastic resin or other nonmetal material.

The operation of the above-described embodiment will be described with reference to FIG. 6.

In response to the actuation of a plush sticking device 40, a central processing unit 41 starts to drive the bucket conveyer 8 and the spider arm conveyer 3 in synchronism with the plush sticking device 40. The bucket conveyer 8 carries the cartridge shell plates 4 in the horizontal state with the plush ribbons 9a and 9b on the upper facing surface thereof. The arm drive mechanism 10 of the spider arm conveyer 3 moves the arms 7 in the counterclockwise direction in FIG. 1, such that the moving speed of the arms 7 in the first straight track section 6a is equal to the advancing speed of the bucket conveyer 8. The arm 7 passing through the pick-up station 18 is lowered to pick up one of the cartridge shell plates 4 from the bucket conveyer 8, by virtue of the attractive force of the magnet 15.

While the arm 7 holding the cartridge shell plate 4 moves along the first curve 6c, an inspection signal indicating whether or not the cartridge shell plate 4 is defective is generated from a surface inspecting circuit 43 based on an image signal from the TV camera 12. Because the spacing between the distal ends 7a of the arms 7 holding the cartridge shell plates 4 is increased in the first curve 6c, the cartridge shell plates 4 are spaced sufficiently from each other when inspected individually through the TV camera 12, so that defective cartridge shell plates 4 are properly distinguished. Also the photo-sensor 11 can generate a detection signal for a long interval for each cartridge shell plate 4, so that a shell plate counter 44 can reliably count the cartridge shell plates 4. Based on the count signal from the shell plate counter 44 as well as the inspection signal from the surface inspecting circuit 43, a rail controller 45 selectively controls the change-over rail portions 22 to direct main pulley 16 onto one of cam grooves 21a and 21b.

When the arm 7 holding the cartridge shell plate 4 moves into the second straight track section 6b, the rail controller 45 drives one of the change-over rail portions 22 each through a solenoid or the like. For instance, if the first piling box 5a still has a space for the cartridge shell plate 4, and the cartridge shell plate 4 is non-defective, the change-over rail portion 22 of the first piling station associated with the first piling box 5a is changed over to connect to the cam groove 21a, as is shown in FIG. 3. Thereby, the main pulley 16 moves along the groove 20a, 22a, 21a and 20a in the first piling station.

Because the bottom of the groove 21a is lower than the bottom of the groove 21b, as is shown in FIG. 4, the arm 7 moves on the lower course in the first piling station, and passes through the first piling box 5a in a manner as shown in FIG. 5. While the distal end 7a of the arm 7 can pass through the cut-out 27, the cartridge shell plate 4 strikes against the wall portion 25 and is thus dropped into the piling box 5a. The cartridge shell plate 4 is thus put on the bottom plate 28 or on the top of a pile of the cartridge shell plates 4. The piling can be accomplished more smoothly if the distal end 7a of the arm 7 is inclined relative to the horizontal, such that the leading end of the cartridge shell plate 4 attached to the distal end 7a is placed above the trailing end thereof with respect to the moving direction of the arm 7.

The cartridge shell plates 4 are attracted at their one ends to the magnet 30 inside the piling box 5a. Because the cartridge shell plates 4 are made of iron, adjacent cartridge shell plates repel each other under the magnetic force and are kept spaced from each other in the horizontal state. Therefore, the total weight of the upper piled cartridge shell plates 4 is not applied on the lower piled cartridge shell plates. Since the bottom plate 28 is stepped down by the driver 31 each time one cartridge shell plate 4 is put on top of another cartridge shell plate 4, all of the piled shell plates 4 simultaneously gradually slip down into the piling box 5a. Thereby, the vertical distance of the topmost one of the piled cartridge shell plates 4 from the cartridge shell plate 4 attached to the arm 7 passing through the first piling box 5a is also kept constant.

When the first piling box 5a is fulfilled in this way, and it is determined that the bottom plate 28 of the first piling box 5a reaches its lowest position, or the shell plate counter 44 has counted up to a predetermined value, the driver 31 is caused to output an end signal to the rail counter 45. Responsive to the end signal, the rail controller 45 switches the change-over rail portion 22 from the deep cam groove 21a to the shallow cam groove 21b in the first piling station for the first piling box 5a and, at the same time, switches the change-over rail portion 22 from the shallow cam groove 21b to the deep cam groove 21a in the second piling station for the second piling box 5b. In result, the arms 7 holding the base plates 7 pass over the first piling box 5a and go down into the second piling box 5b. The distal ends 7a of the arms 7 pass through the cut-out 27 of the second piling box 5b, leaving the cartridge shell plates 7 in the second piling box 5b. Thereby, the cartridge shell plates 7 are seriatim stacked in the second piling box 5b in the same way as above.

Meanwhile, the cartridge shell plates 7 having been piled in the first piling box 5a are transferred to the next assembling process or are stacked in a depot. According to a preferred embodiment, the piling boxes 5a to 5d can be individually moved to the next assembling station, to the depot or to another station under the control of a shell plate take-out controller 46, while the associated change-over rail portion 22 is connected to the shallow cam groove 21b.

If it is necessary to change the type of the photographic film cartridge or to renew the design of the film cartridge, the rail controller 45 switches the change-over rail portions 22 even before one of the first to third piling boxes 5a to 5c, for instance the second piling box 5b is fulfilled, such that cartridge shell plates of new type or new design begin to be piled in the next piling box 5c. While the piling box 5c is being fulfilled, the first piling box 5a is emptied and returned from the depot or the assembling station to the first piling station, or another empty piling box is placed in the first piling station. Therefore, the same cartridge shell plates are piled in the same piling box without the need for interruption of the operation of the apparatus.

In case of a defective cartridge shell plate 4, the rail controller 45 switches the change-over rail portion 22 for the fourth piling box 5d from the shallow cam groove 21b to the deep cam groove 21a, while connecting the change-over rail portions 22 for the first to third piling boxes 5a to 5c to the shallow cam grooves 21b. Thereby, the defective cartridge shell plates 4 are all piled in the fourth piling box 5d. In this embodiment, three piling boxes 5a to 5c are provided for piling non-defective cartridge shell plates 4, but it is of course possible to provide any number of piling boxes for non-defective cartridge shell plates 4.

Figure 7:
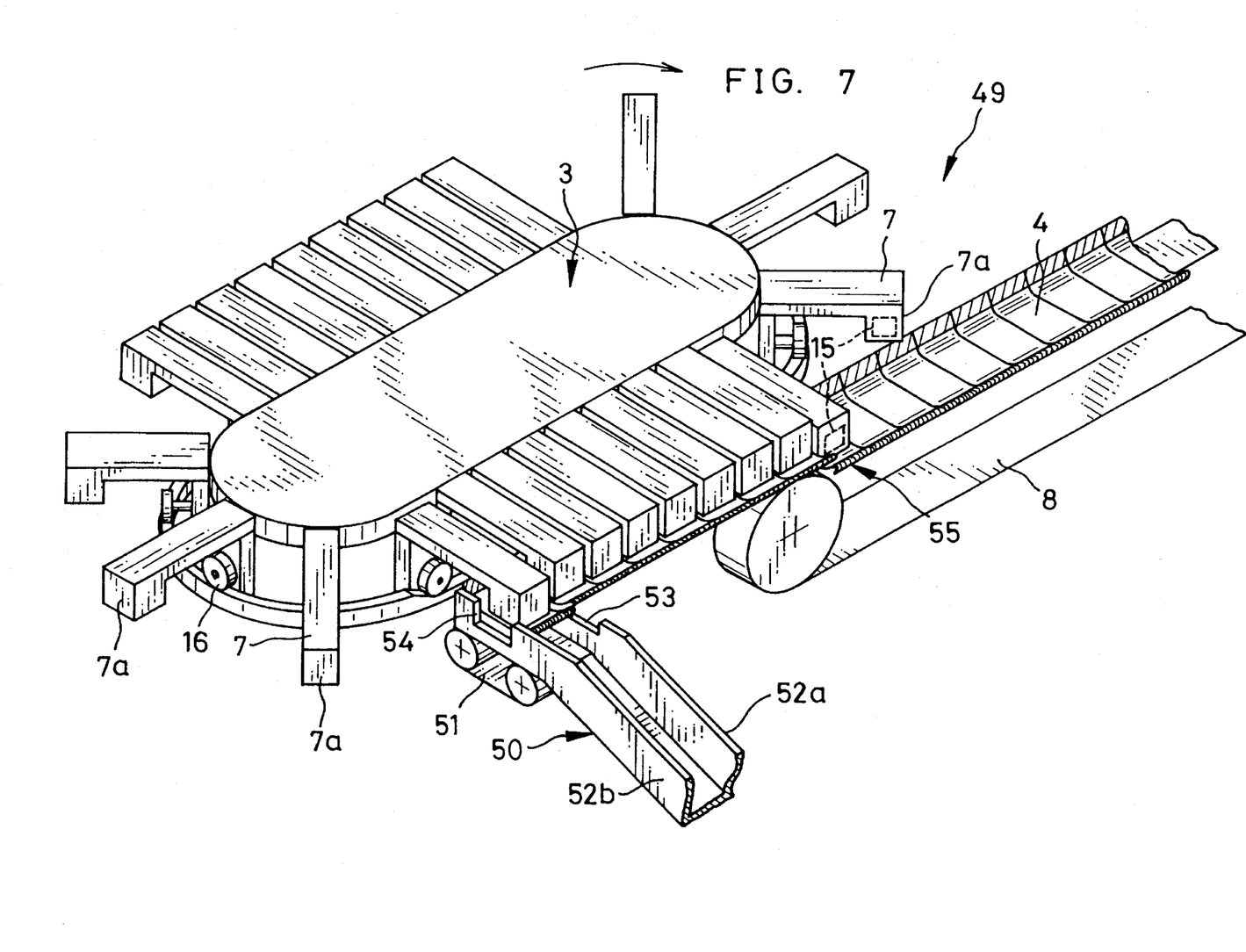
FIG. 7 is a perspective view of a cartridge shell plate stacking apparatus according to another preferred embodiment of the present invention.

FIG. 7 illustrates a cartridge shell plate stacking apparatus 49 according to another embodiment of the invention, wherein a bucket conveyer 8 for feeding the cartridge shell plates 4 to a spider arm conveyer 3 and a shoot 50 for separating the cartridge shell plates 4 from arms 7 of the spider arm conveyer 3 are disposed on the same side of the spider arm conveyer 3, that is, on the side of a straight track portion of an oval track around which the arms 7 rotate in clockwise direction in FIG. 7. The bottom surface of the upper end of the shoot 50 is oriented horizontally, and a belt conveyer 51 is incorporated in the bottom surface. The shoot 50 has a pair of guide fences 52a and 52b for preventing the cartridge shell plates 4 from dropping aside the shoot 50. The one guide fence 52a which is disposed in an upper portion in the arm rotating direction, has a cut-out 53 in the upper end thereof that permits passage of the distal end 7a of the arm 7 with the cartridge shell plate 4 attached thereto. The other guide fence 52b which is disposed in a lower position in the arm rotating direction, also has a cut-out 54 in the upper end thereof. But the cut-out 54 permits passage of only the distal end 7a.

A cam rail 17' is formed such that the arms 7 having pulleys 16 move on the rail 17' to be transiently lowered when passing through a pick-up station 55 which is disposed at the beginning of a straight track section of a circulating course of the arms 7. Since the trailing end of the bucket conveyer 8 is disposed below the pick-up station, the cartridge shell plate on the trailing end of the bucket conveyer 8 is attracted to a magnet 15 mounted in the distal end 7a of the arm 7. When the arm 7 holding the cartridge shell plate 4 reaches the shoot 50, the distal end 7a passes through the cut-out 54, but the cartridge shell plate 4 strikes against the guide fence 52b to be dropped onto the short belt conveyer 51. Thereafter, the cartridge shell plate 4 is conveyed on the shoot belt conveyer 51 to slide down along the shoot 50.

The controller of the invention can be a known microprocessor based programmable controller or another appropriate device. The various components of the invention can be driven by known devices such as solenoids, stepper motors, or the like. Finally, any required position sensing can be accomplished with known sensors.

While the present invention has been described with respect to the preferred embodiments shown in the drawings, the present invention is not to be limited to the above-described embodiments, but on the contrary, various modifications may be possible without departing from the scope of the invention as defined by the appended claims.

What is claimed is:

1. An apparatus for stacking U-shaped cartridge shell plates of photographic film cartridges after light-trapping plush ribbons are stuck on said cartridge shell plates before said cartridge shell plates are assembled into said photographic film cartridges, said apparatus comprising:

a track having at least a pick-up station and at least a piling station;

a plurality of arms each having an attraction member for releasably securing one of said cartridge shell plates onto said arm in a horizontal state, said arms being driven to circulate around said track;

a conveyer for successively conveying said cartridge shell plates in said horizontal state toward said pick-up station which is under the path of said arms, said conveyer moving at the same speed in the same direction as said arms in said pick-up station;

a separation member disposed in association with said piling station, for detaching said cartridge shell plate from said attraction member; and a cam member coupled to said arms for transiently lowering the position of said arms in said pick-up station and said piling station, so as to permit said attraction member to attract said cartridge shell plate in said pick-up station and to permit said separation member to detach said cartridge shell plate from said attraction member in said piling station wherein said cam member is an annular cam rail extending along said track, and said arms each have a pulley mounted thereon which rolls along said cam rail when said arms are driven to circulate, said cam rail having lowered rail portions in correspondence with said pick-up station and said piling station.

2. An apparatus as recited in claim 1, wherein said cartridge shell plates are made of iron, and said attraction members are magnets mounted in a distal end of each of said arms respectively, said arms extending radially relative to said track.

3. An apparatus as recited in claim 2, wherein said magnets are recessed in said distal ends so as not to contact said cartridge shell plates.

4. An apparatus as recited in claim 2, wherein said cam rail includes a bypass rail portion for causing said pulleys to bypass one of said lowered rail portions, and a change-over rail portion movable to be connected either to said bypass rail portion or to said one lowered rail portion, detachment of said cartridge shell plate is avoided when said pulley rolls along said bypass rail portion.

5. An apparatus as recited in claim 4, wherein a plurality of said piling stations are provided, and one of said separation members, said lowered rail portions, said bypass rail portions and said change-over rail portions are disposed in association with each of said separation members.

6. An apparatus as recited in claim 5, further comprising shell plate inspecting and counting means disposed between said pick-up station and said piling station, wherein one of said separation members is provided for detaching defective ones of said cartridge shell plates in response to a signal from said inspecting and counting means.

7. An apparatus as recited in claim 6, wherein said track is an oval track consisting of at least one straight track section and a curved section, and said pick-up station and said piling station are disposed in said at least one straight track section.

8. An apparatus as recited in claim 7, wherein said oval track has first and second straight track sections, and first and second curved sections connecting said first and second straight track sections to each other, and said pick-up station is disposed in said first straight track section, whereas said piling stations are disposed in said second track section.

9. An apparatus as recited in claim 8, wherein said inspecting and counting means is disposed in said first curved section, and said distal ends of said arms are spaced further from each other wherein said first curved section compared with when in said straight track sections.

10. An apparatus as recited in claim 2, wherein said separation member comprises a wall extending transverse to the path of said distal ends of said arms and a cut-out formed in the top edge of said wall such that said cut-out allows passage of said distal end of said arm, but does not allow passage of said cartridge shell plate attracted by said magnet.

11. An apparatus as recited in claim 10, wherein said separation member further comprises a shoot having a pair of guide fences, and said wall having said cut-out is constituted of an upper end portion of one of said guide fences which is disposed farther from said pick-up station in the moving direction of said arms.

12. An apparatus as recited in claim 10, wherein said separation member further comprises a rectangular box in which said cartridge shell plates are piled on top of another, and said wall having said cut-out is constituted of one side wall of said rectangular box which is disposed farther from said pick-up station in the moving direction of said arms.

13. An apparatus as recited in claim 12, wherein a bottom wall of said rectangular box is mounted to be movable in a vertical direction and is lowered by a predetermined amount each time a said cartridge shell plate is separated from said arm and drops into said rectangular box.

14. An apparatus as recited in claim 13, wherein said rectangular box has a magnet mounted to a side wall thereof which extends parallel to said track, said magnet keeping said cartridge shell plates in said horizontal state at uniform spacings in said rectangular box.

15. An apparatus as recited in claim 13, wherein said rectangular box is movably disposed in the vicinity of said lowered rail portion.

16. An apparatus for stacking U-shaped cartridge shell plates of photographic film cartridges after light-strapping plush ribbons are stuck on said cartridge shell plates before said cartridge shell plates are assembled into said photographic film cartridges, said apparatus comprising:

a track having at least a pick-up station and at least a piling station;

a plurality of arms extending lengthwise in a first direction, each of said arms having an attraction member for releasably securing one of said cartridge shell plates onto said arm in a horizontal state, said arms being driven in a second direction, which is transverse to said first direction, to circulate around said track;

a conveyer for successively conveying said cartridge shell plates in said horizontal state toward said pick-up station which is under the path of said arms;

a separation member disposed in association with said piling station, for detaching said cartridge shell plate from said attraction member; and a cam member coupled to said arms for transiently lowering the position of said arms in said pick-up station and said piling station, so as to permit said attraction member to attract said cartridge shell plate in said pick-up station and to permit said separation member to detach said cartridge shell plate from said attraction member in said piling station.

* * * * *